3,334,060
VINYL HALIDE POLYMER COMPOSITIONS
Jacques D. Robinson, Alvin, Tex., assignor to Monsanto Company, St. Louis, Mo., a corporation of Delaware
No Drawing. Filed Dec. 31, 1963, Ser. No. 334,930
14 Claims. (Cl. 260—33.6)

The present invention relates to polymer compositions. More particularly, the present invention relates to vinyl halide polymer compositions containing particular petroleum derived components.

Polyvinyl halides, as well as many of their copolymers, are inherently brittle in character. To overcome this brittleness and impart commercially desirable properties to these materials, it is generally necessary to incorporate plasticizers in the polymeric compositions. For many utilities, however, it is necessary to add relatively large proportions of plasticizer to the polymer to obtain the desired degree of flexibility and plasticity. The most widely accepted and effective plasticizers presently known for polyvinyl halide compositions are the organic esters such as dioctylphthalate, dibutylphthalate and the like. These plasticizing compounds are relatively expensive and, in some instances, difficult to obtain, thus, many possible utilities for polyvinyl halide compositions are prohibited.

In the search for less expensive and more available plasticizers for vinyl halide polymers, various petroleum- and coal tar-derived fractions have been investigated. Generally, these investigations have developed, at best, petroleum-derived fractions usable as secondary plasticizers or plasticizers which are usable in combination with the above mentioned organic ester primary plasticizers. For instance U.S. Patent No. 2,580,290 teaches the use of high molecular weight hydrocarbons derived or extracted from mineral oil distillates or residues by the use of selective solvents such as $SO_2$, $SO_2$-benzole, alcohols, furfural and phenol in combination with an organic ester polyvinyl chloride plasticizing compound. However, prior art petroleum-derived fractions have for the most part have been found unsuitable as primary plasticizers for vinyl halide polymers. Generally, the petroleum-derived fractions have been found to be incompatible with the polymer composition and to exude from the polymer composition on aging. Also, these petroleum-derived fractions have been found to be overly susceptible to hydrocarbon solvent action, or to be unsable in the polymer composition as a result of highly volatile components.

It is an object of the present invention to provide a petroleum derived fraction suitable as a primary plasticizer for vinyl halide polymers. Another object of the present invention is to provide new and useful compositions comprising vinyl halide polymers and a particular petroleum-derived fraction and a method of preparing said compositions. Additional objects will become apparent from the following description of the invention herein disclosed.

The present invention which fulfills these and other objects, comprises a composition comprising a vinyl halide polymer and a hydrocarbon fraction obtained by the solvent extraction with a dialkylsulfoxide solvent of a high boiling petroleum-derived cracking residue. These compositions are useful as coating and molding compositions. The petroleum-derived fractions of the present invention have been found to be quite compatible with vinyl halide polymers without the addition of organic esters or other primary plasticizers. Furthermore, the compositions of the present invention have been found to be highly resistant to hydrocarbon solvent action and to withstand relatively high temperatures with little loss of material.

The term "polymer" as used herein, refers not only to homopolymers but also to copolymers. For example a polyvinyl chloride and a vinyl chloride-vinyl acetate copolymer are equally within the meaning of the term "polymer" as used herein.

The high boiling petroleum-derived cracking residue, hereinafter referred to as "fractionator bottoms," is obtained by the vacuum distillation of the cracked oil product from the thermal or catalytic cracking of conventional cracking feed stocks. Preferably, the fractionator bottoms are obtained by catalytically cracking petroleum oil at 400 to 500° C. In such cracking operations, relatively low pressures, varying from atmospheric to 100 p.s.i.g., are most often employed. A particularly preferred fractionator bottoms is that obtained from the fluid catalytic cracking at 400 to 500° C. of petroleum oil. To obtain the fractionator bottoms used in the present invention, the cracked oil products resulting from the cracking operation are subjected to fractionation, generally at reduced pressures, and the material boiling below about 300° C. at atmospheric pressure, distilled from the product mass. The relatively high boiling residue fraction, boiling above 300° C. at atmospheric pressure, is the material which is extracted with a dialkylsulfoxide solvent to obtain the hydrocarbon plasticizer fraction of the present invention.

In order to demonstrate, as well as to further describe the present invention, the following examples are presented. These examples are in no way to be construed as limiting the present invention.

EXAMPLE I

A fractionator bottoms obtained from the fluid catalytic cracking of petroleum and having a density of approximately 0.961 at 20° C., a refractive index of 1.562 at 20° C. and a viscosity index of 53.72 was thoroughly agitated with dimethyl sulfoxide in a solvent to fractionator bottoms volume ratio of 1:4. The mixture was allowed to stand until an extract and raffinate phase had formed and the two phases then separated. This procedure was substantially repeated on the raffinate phase from which a second extract phase was separated. This procedure was then repeated a third time on the raffinate of the second stage extraction. Again the extract and raffinate phases were separated. All three extraction stages were carried out at room temperature, 72–75° F. The three extract phases were then combined and subjected to fractional distillation at a reduced pressure to distill the solvent from the extracted hydrocarbons. The aromatic extract remaining as bottoms from this distillation represented approximately 30.5 weight percent of the fractionator bottoms. This extract had an initial boiling point of 125° C. at 0.6 mm. Hg and 90 volume percent boiled below 250° C. at 1.4 mm. Hg. This extract was then thoroughly mixed with a polyvinyl chloride having a specific gravity of 1.4, a dry bulk density of 0.48 gram/cc. and known commercially as Opalon 300 and manufactured by Monsanto Chemical Co. The extract represented approximately 40 percent by weight of the extract-PVC composition. Next, the mixture was placed in an oven for 10 minutes at 168° C. and then thoroughly agitated. After this final mixing the mixture was placed in an electrically heated Carver press where it was molded into a film at 160° C. and 10,000 p.s.i.

EXAMPLE II

A second composition was prepared in the manner described in Example I with the exception that the extract was distilled to obtain a heart cut fraction having a boiling range of from 156° C. at 0.7 mm. Hg to 250° C. at 1.4 mm. Hg and a refractive index at 25° C. of 1.637. This heart cut fraction represented approximately 10 percent by weight of the extract. The composition prepared by this method represents a particularly preferred composition.

EXAMPLE III

In order to demonstrate the improvement resulting from the compositions of the present invention in overcoming the hereinabove deficiencies of previously known petroleum-derived fractions, a series of tests were carried out comparing the present compositions with a composition prepared using a well known organic ester primary plasticizer for polyvinyl chloride and with a composition prepared with a commercially available hydrocarbon plasticizer. The organic ester plasticizer was dioctyl phthalate, identified below as DOP, and the hydrocarbon plasticizer, identified below as HC, marketed by Mobil Oil Co., as Mobil XTY-13. Both of these conventional PVC compositions as well as the compositions of the present invention were prepared by the method illustrated in Example I. The tests performed on these compositions were as follows:

Loop compatibility test

This test method provides a relatively severe test of the compatibility of a plasticizer in a polymer composition by determining the degree of exudation of a plasticizer on the inside of a polymer loop. To carry out this test a 65 mil, ½ inch wide strip of a plasticized polymer is placed under stress by folding it into a U shaped loop of about 1¼ inches inside width. The U shaped loop is placed on its side and placed under sufficient stress to maintain the U shape. The test strip is then maintained at 23° C. and 50 percent relative humidity for the testing period. The inside of the loop is examined, for general testing purposes, at 4 hours, 1 day, and 1 week. The results of the test, based on degree of exudation, is recorded at each of these test periods. If there is no exudation, then the plasticizer is said to be compatible. If there is exudation of plasticizer, it is recorded according to the extent of exudation.

Solvent resistane—kerosene

This test was conducted according to ASTM D-239-55. The purpose of this test is to give an indication as to the amount of plasticizer lost through extraction after emersion in kerosene.

Water sensitivity

This test is intended to produce an indication of the sensitivity to water of a plasticized formulation. It measures both the water absorbed and the plasticizer lost through extraction. The percent of plasticizer lost through extraction is determined by ASTM D-1239-52T and the percent water absorbed is determined by ASTM D-570-42.

Volatility

This test is intended to measure the volatile loss from a plastic film specimen by subjecting it to activated carbon at various temperatures. This test is carried out in accordance with ASTM method D-1203-52T.

Hardness

This test was used to measure the hardness of these plastic compositions before, as well as after the volatility test above described. The hardness was obtained by the use of ASTM method D-1706-61.

The results of the above tests are given in the following table.

| Test | Composition | | | |
|---|---|---|---|---|
| | Ex. I | Ex. II | PVC-HC | PVC-DOP |
| Loop Compatibility:[1] | | | | |
| 4 hours | C | C | C | C |
| 1 day | C | C | C | C |
| 1 week | C | C | C | C |
| Solvent Resistance: Percent lost | 1.3 | 2.4 | 18.8 | 52.2 |
| Water Sensitivity: | | | | |
| Percent soluble matter lost | 0.09 | 0.12 | 0.24 | 0.0 |
| Percent absorbed | 0.34 | 0.25 | 0.36 | 0.18 |
| Volatility: Percent lost | 12.8 | 17.3 | 33.7 | 4.0 |
| Hardness: | | | | |
| Initial | 96 | 95 | 69 | 67 |
| After volatility | 100 | 95 | 95 | 63 |

[1] C=Compatible.

Consideration of the above tests data clearly demonstrates the acceptability of the petroleum derived hydrocarbons of the present invention as primary plasticizers for vinyl halide polymers. Further, the compositions of the present invention are found to meet acceptable standards as to flexibility and plasticity as represented by tensile strength and elongation.

To demonstrate the unexpectedness of the present invention a polyvinyl chloride composition was prepared in accordance with the procedure described in Example I with the exception that the solvent used was furfural. The resulting composition was found to exude plasticizer within one day, thus destroying the effectiveness of the extract as a primary plasticizer.

The solvents which are useful for obtaining the plasticizers of the present invention are the dialkylsulfoxides. These compounds have the formula

wherein $R_1$ and $R_2$ are alkyl radicals. Generally, the alkyl radicals represented by $R_1$ and $R_2$ contain 1 to 10 carbon atoms. These alkyl radicals may be straight or branched chain, but are preferably straight chain. Several non limiting examples of the dialkyl sulfoxides are:

| Column I | Column II |
|---|---|
| Dimethyl sulfoxide | Ethyl n-octyl sulfoxide |
| n-Butyl n-propyl sulfoxide | Diethyl sulfoxide |
| Dipropyl sulfoxide | Methyl n-nonyl sulfoxide |
| Di-n-butyl sulfoxide | n-Butyl n-heptyl sulfoxide |
| n-Butyl n-hexyl sulfoxide | n-Amyl n-hexyl sulfoxide |
| n-Amyl n-propyl sulfoxide | Di-nonyl sulfoxide |
| Diamyl sulfoxide | n-Docyl methyl sulfoxide |
| n-Propyl n-hexyl sulfoxide | Didecyl sulfoxide |
| Dioctyl sulfoxide | Dihexyl sulfoxide |
| Methyl n-octyl sulfoxide | n-Heptyl n-amyl sulfoxide |
| Diheptyl sulfoxide | n-Decyl ethyl sulfoxide |

In the practice of the present invention, the extraction procedure is usually carried out at a temperature of 10 to 200° C. and at pressures ranging from subatmospheric up to 200 p.s.i.g. and higher. It is preferred that the extraction temperature be at or near room temperature or somewhat more broadly, within the range of 15 to 40° C. Preferred pressures for the solvent extraction procedure are substantially at atmospheric or within the range of from atmospheric pressure up to 10 to 15 p.s.i.g.

The ratio of dialkylsulfoxide solvent to fractionator bottoms useful in obtaining the petroleum derived primary plasticizer of the present invention are usually within the range of 0.1 to 10.0 volumes of solvent per volume of feed. A preferred solvent-to-feed volume ratio is found within the range of 0.2:1 to 4:1.

The manner in which the dialkyl sulfoxide solvents are contacted with the fractionator bottoms to provide the extracts useful as primary plasticizers in the present compositions may be by any of the conventional methods. The prime requirement is that there be a thorough and intimate contact between feed and solvent in order to maximize the efficiency of the solvent. The extraction may be carried out by several separate extraction stages, as illustrated by the Examples I and II or the extraction may be carried out in a multi-stage extraction column. Generally, at least two extraction stages are utilized to obtain the hydrocarbon plasticizer fraction of the present invention.

The method whereby the material extracted from the fractionator bottoms is obtained from the loaded solvent extract is in most instances by simple vacuum distillation. Usually a simple flash distillation apparatus of one to three theoretical plate efficiency will suffice. In order to avoid decomposition of the solvent, it generally is necessary to conduct this distillation step at reduced pressures to avoid the solvent decomposition temperature. The particular reduced pressure used will vary with the solvent since decomposition temperature depends on the nature of the particular dialkylsulfoxide solvent. However, it is easily within the ability of those skilled in the art to determine the proper pressure necessary to prevent the decomposition of any particular solvent within the scope of the present invention.

In order to obtain a particular preferred petroleum derived plasticizer composition, it is often desirable to distill the extracted materials to obtain a fraction having a boiling range within the range of from equivalent to approximately 125° C. at 0.6 mm. Hg to 250° C. at 1.5 mm. Hg. Example II, hereinabove presented, illustrates the preparation and use of this preferred plasticizer composition. In addition to obtaining this preferred plasticizer fraction by distillation, a preferred fraction having the above properties may be obtained by a 1 to 10 stage solvent extraction of the fractionator bottoms in a multi-stage liquid-liquid extraction column. However, it is usually preferred to use a 2 to 5 stage solvent extraction.

The polymeric compositions of the present invention usually contain 0.2 to 70 percent by weight of the novel petroleum derived plasticizers of the present invention. Preferably, however, the polymeric compositions of the present invention contain 0.5 to 50 percent by weight of the present petroleum derived plasticizers. It is within the scope of the present invention that other plasticizers may be used with the present compositions to alter the polymer properties for certain specific end uses. If a second plasticizer is used in the present compositions, it is used in an amount equivalent to 0.1 to 10 parts by weight per part by weight of the plasticizers of the present invention. Preferably, however, 0.5 to 5 parts by weight per part by weight of the plasticizers of the present invention is used.

The resinous component of the compositions of the present invention is a polymer of a vinyl halide such as vinyl bromide, vinyl chloride, or vinyl fluoride, including copolymers thereof with other polymerizable compounds, i.e., thermoplastic polymers composed essentially of vinyl halide units and containing only the amount of halogen contained in the polymer as formed by the polymerization of the monomer units. Of these, the most practical compositions are obtained with polyvinyl chloride or copolymers of vinyl chloride and another copolymerizable compounds, particularly vinyl acetate. Particularly suitable compositions are obtained with polyvinyl chloride per se as well as with the copolymers of vinyl chloride with 5 to 30 percent vinyl acetate or with up to about 50 percent vinylidene chloride. Other copolymers include a vinyl halide copolymerized with another compound containing the polymerizable group.

$$CH_2=C<$$

or other polymerizable group such as, for example, vinyl formate, vinyl acetatee, vinyl propionate, vinyl butyrate, vinylidene dichloride, styrene, methyl acrylate, ethyl acrylate, butyl acrylate, methyl methacrylate, ethyl ethacrylate, allyl acetate, allyl chloride, allyl formate, vinyl chloracetate, allyl trichloracetates, methallyl acetate, chlorostyrene, dichlorostyrene, acrolein, acrylonitrile, methacrolein, methacrylonitrile, methacrylic acid, methyl vinyl ketone, methyl isopropenyl ketone, methyl vinyl ether, methyl allyl ether, and the like. It is preferred that the copolymers be derived from a mixture wherein the vinyl halide is the major constituent thereon and more preferably where it is the predominate constituent, i.e., more than 90 percent of the mixture. If desired, the copolymers can be obtained from the mixture of the vinyl halide with two or more other polymerizable compounds. In its preferred embodiment, the compositions of the present invention contain vinyl chloride homopolymers and/or copolymers as the vinyl halide.

Other suitable vinyl halide copolymers are those obtained by copolymerizing vinyl chloride with another compound containing two of the polymerizable vinylidene groups as are present, for example, in divinyl benzene, divinyl adipate, allyl methacrylate, diallyl phthalate, etc. The divinylidene-containing compound is used in sufficiently small quantity so that the copolymer remains thermo-plastic and is not thermo-setting to an infusible resin. The amount of divinylidene-containing compound used in admixture is usually less than about 1 percent, to obtain a thermo-plastic polymer. When a thermo-setting polymer is desired, a larger quantity of the divinylidene-containing compound is used.

All of the thermo-plastic polymers employed in the compositions of the invention are solid materials at normal temperature (20° C.) and consequently are of high molecular weight. In general the polymers have molecular weights of about 4,000 to 90,000.

While the petroleum-based plasticizers disclosed herein can be used alone as a plasticizer for the polymer, it is desirable in some cases to employ other substances as coplasticizers with this material. The substances useful as plasticizers in combination with the present petroleum-based plasticizers are esters compatible with the vinyl halide polymers. By compatible is meant those esters which form homogeneous compositions with the polymer. The compatible esters which are used boil above 250° C. or above about 125° C. under 1 mm. Hg pressure. For this purpose the phosphoric acid esters of phenols and aliphatic alcohols such as tricresyl phosphate, tritolyl phosphate, trioctyl phosphate, and tributoxy ethyl phosphate are particularly suitable. The alkyl and alkoxyalkyl esters of dicarboxylic acids having the required high boiling point are also a preferred class of conjunctive plasticizers. Among representative examples of suitable esters for use in the invention are such compounds as dibutyl phthalate, di-isobutyl phthalate, diamyl phthalate, dioctyl phthalate, dibenzyl phthalate, diallyl phthalate, dimethylallyl phthalate, butyrin, dibutyl digylcollate, dibutyl adipate, dicyclohexyl phthalate, dicyclopentyl phthalate, dibutyl sebacate, dibenzyl sebacate, dioctyl fumarate, dioctyl maleate, butyl acetylricinoleate, butyl phthallyl, butyl glycollate, triethylene glycol dioctanoate, dibutyl Cellosolve phthalate, dibutyl carbitol phthalate, polydiethylene glycol sebacate, and the like. Preferably, the compatible esters are those boiling above 300° C. or above 140° C. at 1 mm. Hg pressure.

The manner of incorporating the herein disclosed novel plasticizers into the vinyl halide polymer and/or copolymer compositions of the present invention may be by any known method. The components of the present invention may be mixed by mechanical mixing or by solution of the polymeric material and the hydrocarbon fraction in a mutual solvent followed by volatilization of the solvent.

Generally, it is necessary to mix the materials at an elevated temperature, usually 130 to 180° C. for a short period of time. A preferred mixing temperature is within the range of 150 to 170° C. On cooling, the polymer compositions of the present invention are ready for their ultimate use.

What is claimed is:

1. A composition consisting essentially of 0.1 to 70 percent by weight of a petroleum based hydrocarbon fraction and a vinyl chloride polymer selected from the group consisting of the homopolymers of vinyl chloride, copolymers of vinyl chloride and vinyl acetate and copolymers of vinyl chloride and vinylidene chloride, said petroleum based hydrocarbon fraction being one obtained by the solvent extraction with a dialkyl-sulfoxide solvent at a temperature within the range of 10 to 200° C. and a pressure of no greater than 200 p.s.i.g. and a solvent to feed volume ratio of 0.1:1 to 10:1, of a high boiling petroleum derived residue obtained as the bottoms fraction from the distillation to an overhead temperature of 300° C. at atmospheric pressure of the cracked oil product obtained by the catalytic cracking of petroleum oil at 400 to 500° C.

2. The composition of claim 1 wherein the vinyl chloride polymer is a homopolymer.

3. The composition of claim 1 wherein the vinyl chloride polymer is a copolymer of vinyl chloride and vinyl acetate.

4. The composition of claim 1 wherein the vinyl chloride polymer is a copolymer of vinyl chloride and vinylidene chloride.

5. The method of preparing a polymer composition consisting essentially of contacting a high boiling petroleum derived cracking residue obtained as a bottoms fraction from the distillation to an overhead temperature of 300° C. at atmospheric pressure of a cracked oil product obtained by the catalytic cracking of petroleum oil at 400 to 500° C., with a dialkylsulfoxide solvent in a solvent to hydrocarbon volume ratio of 0.1:1 to 10:1, a temperature of 10 to 200° C. and a pressure of no greater than 200 p.s.i.g. to obtain an extract of said cracking residue, recovering said extract from said solvent and thereafter admixing said extract with a vinyl chloride polymer to form a homogeneous mixture, said vinyl chloride polymer being one selected from the group consisting of the homopolymers of vinyl chloride, copolymers of vinyl chloride and vinyl acetate and copolymers of vinyl chloride and vinylidene chloride.

6. The method of claim 5 wherein the vinyl chloride polymer is a homopolymer.

7. The method of claim 5 wherein the vinyl chloride polymer is a copolymer of vinyl chloride and vinyl acetate.

8. The method of claim 5 wherein the vinyl chloride polymer is a copolymer of vinyl chloride and vinylidene chloride.

9. A method of plasticizing a vinyl chloride polymer selected from the group consisting of the homopolymers of vinyl chloride, the copolymers of vinyl chloride and vinyl acetate and the copolymers of vinyl chloride and vinylidene chloride consisting essentially of mixing a petroleum based plasticizing fraction with said vinyl chloride polymer and thereby obtaining a plasticized polymeric composition, said petroleum based plasticizing fraction being obtained by the solvent extraction of a high boiling petroleum derived cracked residue obtained as a bottoms fraction from the distillation to an overhead temperature of 300° C. at atmospheric pressure of the cracked oil product obtained by the catalytic cracking of petroleum oil at 400 to 500° C., with a dialkylsulfoxide solvent in a volume ratio of solvent to high boiling petroleum derived cracking residue within the range of 0.1:1 to 10:1 and at a temperature of 10 to 200° C. and a pressure of no greater than 200 p.s.i.g.

10. The composition of claim 1 wherein the cracked oil product results from fluid catalytic cracking.

11. The composition of claim 1 wherein the dialkylsulfoxide solvent is dimethylsulfoxide.

12. The composition of claim 1 wherein the hydrocarbon fraction is one having a boiling range within the temperature range of from approximately 125° C. at 0.6 mm. Hg to 250° C. at 1.5 mm. Hg pressure and is obtained by distillation of the extract of the solvent extraction of a high boiling petroleum derived cracked residue with a dialkylsulfoxide solvent.

13. The method of claim 5 wherein the dialkylsulfoxide solvent is dimethylsulfoxide.

14. The method of claim 5 wherein the extract is one having a boiling range within the temperature range of from approximately 125° C. at 0.6 mm. Hg to 250° C. at 1.5 mm. Hg pressure and is obtained by distillation of the extract of the solvent extraction of a high boiling petroleum derived cracking residue with a dialkylsulfoxide solvent.

References Cited
UNITED STATES PATENTS

| | | | |
|---|---|---|---|
| 2,365,898 | 12/1944 | Morris | 208—240 |
| 2,580,290 | 12/1951 | Fawcett | 260—306 |
| 3,082,182 | 3/1963 | Ford. | |

MORRIS LIEBMAN, *Primary Examiner.*

J. FROME, *Examiner.*